No. 698,439. Patented Apr. 29, 1902.
G. C. BROOKS.
SHIFTING MECHANISM FOR STEERING OR OTHER PURPOSES.
(Application filed Aug. 8, 1901.)
(No Model.)

G. C. Brooks, Inventor

Witnesses

By
Attorney

THE NORRIS PETERS CO., PHOTO-LITHO., WASHINGTON, D. C.

UNITED STATES PATENT OFFICE.

GEORGE C. BROOKS, OF WILSON, NEW YORK.

SHIFTING MECHANISM FOR STEERING OR OTHER PURPOSES.

SPECIFICATION forming part of Letters Patent No. 698,439, dated April 29, 1902.

Application filed August 8, 1901. Serial No. 71,374. (No model.)

*To all whom it may concern:*

Be it known that I, GEORGE C. BROOKS, a citizen of the United States, residing at Wilson, in the county of Niagara and State of New York, have invented certain new and useful Improvements in Shifting Mechanism for Steering or other Purposes, of which the following is a specification.

This invention relates to an improved shifting device for steering mechanism and other purposes, and has particular reference to a mechanism of this character possessing special utility as a steering device for automobiles and other vehicles.

To this end the invention contemplates a simple and effective construction of steering mechanism involving an exceedingly easy action, the same being quickly and readily responsive to the operator, while at the same time comprising means for effecting a steady and uniform adjustment of the axle-journals or other parts to be shifted.

A further object of the invention is to provide a steering mechanism or device comprising means for locking the parts against shifting at any point of adjustment when the steering-handle is released from the operator's hand. This object involves special utility in automobile-steering, inasmuch as the operator may entirely loose his hold of the steering-handle and the vehicle will move in the direction that the wheels are adjusted, and also by reason of the locking action described the vehicle may be run against an obstacle in an angular line to its direction of travel without causing any vibration of the steering-handle or a shifting of the wheels.

A further object is to provide, in connection with the steering mechanism, improved means for taking up the natural wear of the parts, as well as effecting a differential adjustment of the separate parts of the main adjusting-sleeve or sleeve-nut.

With these and many other objects in view, which will more readily appear as the nature of the invention is better understood, the same consists in the novel construction, combination, and arrangement of parts hereinafter more fully described, illustrated, and claimed.

The essential features of the invention are necessarily susceptible to a variety of modifications without departing from the spirit or scope thereof; but the preferred embodiment of the improvements is shown in the accompanying drawings, in which—

Figure 1:
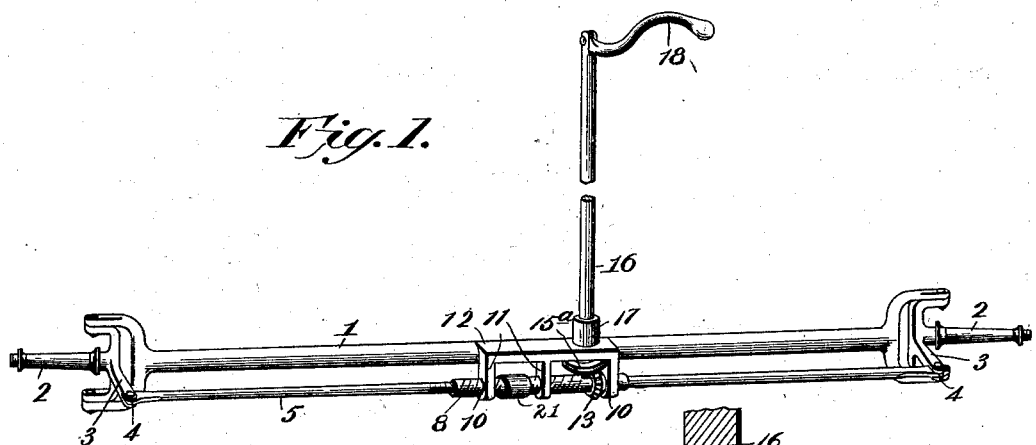
Figure 2:
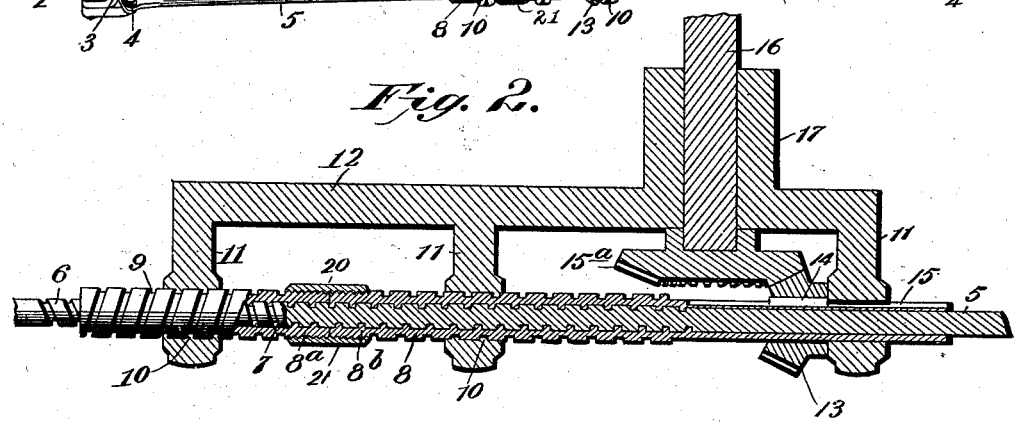
Figure 3:
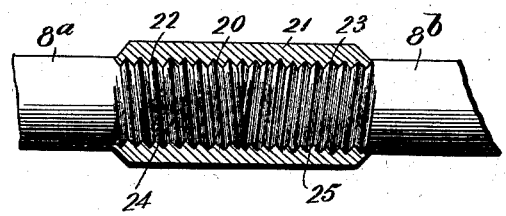
Figure 4:
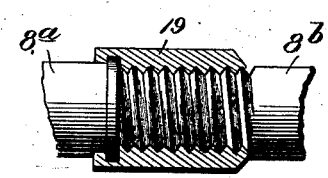

Figure 1 is a perspective view of the front axle of an automobile equipped with a steering mechanism constructed in accordance with the present invention. Fig. 2 is an enlarged longitudinal sectional view of the steering mechanism. Figs. 3 and 4 are detail views showing different forms of couplings which may be utilized in connection with the main adjusting-sleeve or sleeve-nut.

Like numerals of reference designate corresponding parts in the several figures of the drawings.

In carrying out the invention the same may be associated in any suitable manner with the vehicle, boat, belt-shifting device, or other object with which the same may be utilized without departing from the spirit thereof; but for illustrative purposes the preferred application of the mechanism is shown in the drawings.

Referring particularly to the drawings, the numeral 1 designates the forward axle of an automobile or other vehicle provided at the ends thereof with the swinging wheel-spindles 2, which are individually movable, but in unison, to effect a sharp turning of the vehicles in the manner common to automobiles. The particular mounting of these wheel-spindles is of course unimportant as far as the present invention is concerned, and the said spindles may be provided with laterally-extending coupling-arms 3, to which are pivotally connected, as at 4, the opposite ends of a horizontal and longitudinally-movable shift-rod 5. This shift-rod 5 constitutes a part of the shifting or steering mechanism and is provided at a point intermediate the ends thereof with an exteriorly - threaded portion 6, which threaded portion is cut with right - hand threads corresponding to the right-hand interiorly-threaded portion 7 of a longitudinally-movable adjusting-sleeve or sleeve - nut 8, which receives therein the shift-rod 5. The sleeve 8, in addition to the interior thread 7 cut in the same direction as the exterior thread 6 of the shift-rod, is provided with an exteriorly-threaded portion 9, cut in a reverse direction to the thread 6 of the rod, or, in other words, with left-hand threads. Of course it is only necessary to preserve the reverse relation between the exterior threads of the sleeve and of the shift-rod, and the same may therefore respectively be right or left so long as this reverse relation is maintained.

The exteriorly-threaded portion 9 of the sleeve 8 works through threaded bearings 10, formed in certain of the bearing-arms 11 of a carrying-bracket 12, which may be cast integral with the vehicle-axle 1 or otherwise rigidly united thereto in order to support the steering mechanism in an operative position. Motion may be communicated to the adjusting-sleeve 8 through any suitable medium; but a simple construction for imparting a rotation to the sleeve 8 is shown in the drawings and consists of a pinion 13, having a feathered connection 14 with a groove 15, formed longitudinally in the sleeve 8 and meshing with a beveled gear-wheel 15ª at the lower end of an operating-stem 16, turning in a sleeve-bearing 17, extending from the carrying-bracket and having attached to its upper end the steering or operator's handle 18.

It is preferable in the construction of the mechanism to provide means for effecting a proper relative adjustment between the right and left threads of the sleeve 8. This may be accomplished by various forms of couplings—such, for instance, as those shown in Figs. 3 and 4 of the drawings, the construction shown in Fig. 4 simply being a union-coupling 19, while that shown in Figs. 2 and 3 is a double-acting coupling, which may be properly termed a "differential" coupling 20. This differential coupling essentially consists of an exterior adjusting-collar 21, having interiorly-threaded portions 22 and 23, which respectively engage the differently-threaded portions 24 and 25 on contiguous ends of separate parts 8ª and 8ᵇ of the sleeve 8. The differently-threaded portions 24 and 25 are not only reversely related as to the disposition of the threads, but there is also a greater number of threads to the inch on one of said threaded portions than on the other. This provides a complete differential coupling, as by screwing one of the sleeve-sections partly out of the collar and the other section correspondingly farther into the same the relative positions of the right and left hand threads of the machine may be properly arranged, while at the same time all wear or looseness can be readily taken up. The threaded bearings 10 also serve the useful function of taking up all natural wear of the adjustment-sleeve that might cause an end thrust or lateral motion, which would tend to cause the part being adjusted, such as the wheel-spindles, to have an irregular movement.

From the foregoing it is thought that the operation of the mechanism will be readily understood. It is simply necessary to swing the handle 18 to cause a turning of the adjusting-sleeve in either direction, which movement not only effects a longitudinal movement of the sleeve, but also a longitudinal movement of the rod 5 to effect the shifting or steering action. At any point in the adjustment of the parts it is obvious that the interlocking threads prevent longitudinal movement or shifting of the parts except under the influence of the operator's hand upon the handle.

Various changes in the form, proportion, and minor details of construction may be resorted to without departing from the spirit or sacrificing any of the advantages of the invention.

Having thus described my invention, what I claim as new, and desire to secure by Letters Patent, is—

1. A shifting mechanism of the class described, comprising a rotatable and longitudinally-movable interiorly-threaded sleeve, and a longitudinally-movable shift-rod exteriorly threaded to engage with the interior threads of the sleeve.

2. A shifting mechanism of the class described, comprising a suitable support having threaded bearings, an interiorly-threaded rotatable sleeve, interior threads engaging said threaded bearings, and a longitudinally-movable shift-rod having its threads engaging the interior threads of the sleeve and reversely related to the exterior threads of the latter.

3. A steering mechanism of the class described, comprising a support having threaded bearings, an exteriorly and interiorly threaded sleeve working in said bearings and formed in sections, a differential coupling connecting the sections of said sleeve, and an exteriorly-threaded shift-rod having its threads engaging the interior threads of the sleeve and reversely related to the exterior threads of the latter.

4. A shifting mechanism of the class described, comprising a support having threaded bearings, an exteriorly and interiorly threaded sleeve engaging said bearings and having separate sections provided with adjacent differently-threaded ends, and a coupling-sleeve engaging said differently-threaded ends and combining therewith to form a differential coupling, and a threaded shift-rod engaging the interior threads of the sleeve.

5. A shifting mechanism of the class described, comprising a support having threaded bearings, an exteriorly and interiorly threaded sleeve engaging said bearings, a shift-rod having a threaded portion engaging the interior threads of the sleeve, and an operating device including a rotatable gear having a feathered connection with said sleeve.

In testimony whereof I affix my signature in presence of two witnesses.

GEORGE C. BROOKS.

Witnesses:
STANLY A. DWIGHT,
CLARENCE E. JOHNSON.